United States Patent
Dollgast

(10) Patent No.: US 11,011,890 B2
(45) Date of Patent: May 18, 2021

(54) ARRESTER AND METHOD FOR MANUFACTURING AN ARRESTER

(71) Applicant: EPCOS AG, Munich (DE)

(72) Inventor: Bernhard Dollgast, Deutschlandsberg (AT)

(73) Assignee: EPCOS AG, Munich (DE)

( * ) Notice: Subject to any disclaimer, the term of this patent is extended or adjusted under 35 U.S.C. 154(b) by 0 days.

(21) Appl. No.: 15/762,968

(22) PCT Filed: Sep. 14, 2016

(86) PCT No.: PCT/EP2016/071710
§ 371 (c)(1),
(2) Date: Mar. 23, 2018

(87) PCT Pub. No.: WO2017/055088
PCT Pub. Date: Apr. 6, 2017

(65) Prior Publication Data
US 2019/0089133 A1    Mar. 21, 2019

(30) Foreign Application Priority Data
Sep. 28, 2015  (DE) .......................... 102015116332.2

(51) Int. Cl.
*H01T 2/02*    (2006.01)
*H01T 21/00*   (2006.01)
*H01T 1/24*    (2006.01)
*H01T 4/12*    (2006.01)
*H02H 9/06*    (2006.01)

(52) U.S. Cl.
CPC .................. *H01T 2/02* (2013.01); *H01T 1/24* (2013.01); *H01T 4/12* (2013.01); *H01T 21/00* (2013.01); *H02H 9/06* (2013.01)

(58) Field of Classification Search
CPC .... H01T 4/12; H01T 2/02; H01T 1/24; H01T 21/00; H02H 9/06
See application file for complete search history.

(56) References Cited

U.S. PATENT DOCUMENTS

| | | |
|---|---|---|
| 6,721,157 B2 | 4/2004 | Shin |
| 8,503,147 B2 | 8/2013 | Tsukizawa et al. |
| 8,814,536 B2 | 8/2014 | Laverdiere et al. |
| 2004/0125530 A1 | 7/2004 | Tominaga et al. |

(Continued)

FOREIGN PATENT DOCUMENTS

| | | |
|---|---|---|
| CN | 204947321 U | 1/2016 |
| DE | 2204988 | 8/1973 |

(Continued)

OTHER PUBLICATIONS

Machine Translation of JP2001006840 (Year: 2001).*

(Continued)

*Primary Examiner* — Joseph L Williams
*Assistant Examiner* — Jacob R Stern
(74) *Attorney, Agent, or Firm* — DLA Piper LLP (US)

(57) ABSTRACT

An arrester comprising a plurality of layers arranged one above another and comprising a cavity is specified, wherein the cavity extends through at least two of the layers and wherein electrodes adjoining the cavity are arranged between said two layers. Furthermore, a method for manufacturing an arrester is specified.

13 Claims, 5 Drawing Sheets

(56) References Cited

U.S. PATENT DOCUMENTS

2007/0285866 A1   12/2007  Ueda et al.
2012/0236450 A1    9/2012  Adachi
2014/0261270 A1*  9/2014  Burrows ................. F02P 23/04
                                                                                   123/143 B

FOREIGN PATENT DOCUMENTS

| JP | H10106713 A | 4/1998 |
| JP | 2001-006840 | 1/2001 |
| JP | 2001 006840 | 1/2001 |
| JP | 2001-043954 | 2/2001 |
| JP | 2001 043954 | 2/2001 |
| JP | 2001-143846 | 5/2001 |
| JP | 2003297524 A | 10/2003 |
| JP | 2004127614 A | 4/2004 |
| JP | 2010040242 A | 2/2010 |
| JP | 2011028968 A | 2/2011 |
| JP | 2011-187439 | 9/2011 |
| WO | WO 2015/087394 | 6/2015 |
| WO | WO 2015 087394 | 6/2015 |

OTHER PUBLICATIONS

Machine Translation of JP2001143846 (Year: 2001).*
International Prelimnary Report on Patentability for PCT/EP2016/071710, dated Apr. 23, 2018 (7 pgs.).

* cited by examiner

ARRESTER AND METHOD FOR MANUFACTURING AN ARRESTER

PRIORITY CLAIMS

This application is a 371 U.S. national stage filing of and claims the benefit and priority under 35 U.S.C. §§ 119, 120, 364 and 365 to PCT/EP2016/071710, filed on Sep. 14, 2016, that in turn claims priority under 35 USC 119 and 120 to German Application No. 102015116332.2 dated Sep. 28, 2015, the entirety of all of which are incorporated herein by reference.

FIELD

An arrester for protection against overvoltages is specified. In particular, an arrester of multilayer design is involved. Furthermore, a method for manufacturing an arrester is specified.

BACKGROUND

An arrester is a gas arrester comprising a gas-filled cavity. In the event of a limit voltage being exceeded, an arc flashover between two electrodes occurs in the interior of the arrester, as a result of which a limitation of the voltage is achieved. By way of example, the arrester is used in the field of telecommunications.

U.S. Pat. Nos. 6,721,157 B2, 8,503,147 B2, 8,514,536 B2 and US 2007/0285866 A1 disclose arresters, in particular arresters of multilayer design.

SUMMARY

It is an object of the present invention to specify an improved arrester and a method for manufacturing an arrester.

In accordance with a first aspect of the present invention, an arrester comprising a plurality of layers arranged one above another is specified. The layers are preferably configured in an electrically insulating fashion. By way of example, ceramic layers are involved. The layers are preferably all sintered jointly. By way of example, each of the layers is produced from one or a plurality of green films.

The arrester comprises a cavity extending through at least two of the layers. Preferably, the cavity extends completely through said two layers. The cavity is preferably completely closed off toward the outside. In particular, the arrester comprises at least two layers that delimit the cavity toward the bottom and top.

Electrodes adjoining the cavity are arranged between the two layers through which the cavity extends. The electrodes comprise in particular electrode ends between which an arc flash is formed when an overvoltage occurs. The electrode ends, too, are arranged between the two layers through which the cavity extends. In particular, the electrode ends extend parallel to the plane of the layers. Preferably, the electrode ends are discernible as narrow lines parallel to the plane of the layers as viewed from the cavity.

Such an arrangement of the electrodes allows simple and reliable manufacture of the arrester. In particular, the electrodes can be applied on a layer as early as before the cavity is formed. The electrodes thus need not be introduced into an existing cavity, as a result of which manufacture is simplified. Furthermore, the shape of the cavity can be varied in conjunction with an unchanged method for manufacturing the electrodes. This enables a flexible adaptation of the shape of the cavity and thus of the properties of the arrester toward the respective field of use. Furthermore, this design enables extensive miniaturization of the arrester down to the physical limits of the arc flash.

By way of example, the electrodes are applied as electrode paste on a green film. In order to form the cavity, a hole is then introduced into the green film, wherein the hole perforates the electrode paste, such that two separate electrodes are formed. After all the layers have been stacked one above another, the layer stack is sintered.

By way of example, the electrodes comprise copper and/or tungsten. The electrodes can also comprise different materials in sections. By way of example, the electrode ends comprise tungsten and a section of the electrodes that is remote from the cavity comprises a different material, e.g. copper. Tungsten is particularly well suited as material for the electrode ends on account of its high thermal stability, with the result that a high endurance strength is ensured.

By way of example, the arrester comprises a lower cover layer and an upper cover layer, which delimit the cavity toward the bottom and top. The electrodes are preferably spaced apart from the lower cover layer and the upper cover layer. In this way, it is possible to prevent a discharge from taking place via the cover layers in the event of an overvoltage.

By way of example, the electrode ends are arranged at half the height of the cavity. Consequently, the electrode ends are at an equal distance from the lower cover layer and the upper cover layer.

In one embodiment, the electrodes of the arrester are configured as a strip interrupted by the cavity. The arrester can also comprise more than two electrodes. In one embodiment, the arrester comprises four electrodes. The four electrodes are configured for example in the form of a cross perforated by the cavity.

By way of example, all the electrodes of the arrester are arranged on one layer. Alternatively, the electrodes can also be arranged on different layers. The electrodes are preferably all formed from the same material.

The shape of the cavity is preferably translationally invariant with respect to the stacking direction of the layers. In this case, the cavity can be produced in a simple manner by stamping out. In particular, the cavity has the shape of a right cylinder. In one embodiment, the basic area of the cavity is configured in a rectangular fashion.

In a further embodiment, the basic area has six or more corners. By way of example, the basic area is configured in a hexagonal or octagonal fashion.

By way of example, the basic area is shaped in such a way that the free path between the electrode ends through the gas-filled cavity is significantly shorter than a path along the walls of the cavity. This makes it possible to form a well-defined arc flash between the electrode ends.

In one embodiment, the arrester comprises at least one auxiliary electrode adjoining the cavity. The auxiliary electrode preferably comprises a different material than the electrodes. By way of example, the auxiliary electrode comprises graphite. The auxiliary electrode makes it possible to support the formation of an arc flash between the electrode ends. The auxiliary electrode thus serves as an ignition aid.

The auxiliary electrode is preferably spaced apart from the electrodes. By way of example, the auxiliary electrode is arranged on a different layer than the electrodes. By way of example, the auxiliary electrode is arranged in a height-offset manner with respect to the electrode as viewed in the stacking direction. In one embodiment, at least two auxiliary electrodes are provided. By way of example, the auxiliary electrodes are arranged on a common layer. In one embodiment, the auxiliary electrodes are arranged on different layers.

By way of example, the arrester comprises four auxiliary electrodes, wherein two auxiliary electrodes are arranged on a layer arranged above the electrode-carrying layer and two auxiliary electrodes are arranged on a layer arranged below the electrode-carrying layer.

In accordance with a further aspect of the present invention, an arrester is specified which comprises a plurality of layers arranged one above another, a cavity being formed in said layers, and electrodes adjoining the cavity. The electrodes are formed from different materials in sections. By way of example, the electrode ends comprise tungsten and a section of the electrodes that is removed from the cavity comprises a different material, e.g. copper. By way of example, the arrester has one or more of the functional and/or structural properties of the arrester described above.

In accordance with a further aspect of the present invention, an arrester is specified which comprises a plurality of layers arranged one above another, a cavity being formed in said layers. The arrester comprises electrodes having electrode ends, wherein the electrode ends adjoin the cavity and extend parallel to the plane of the layers. The cavity has a non-rectangular basic area. By way of example, the cavity has a basic area in the shape of a hexagon or an octagon. Preferably, the basic area is configured in such a way that the free path between the electrode ends through the cavity is significantly shorter than a path along the walls of the cavity. This makes it possible to form a well-defined arc flash between the electrode ends. By way of example, the arrester has one or more of the functional and/or structural properties of the arrester described above.

In accordance with a further aspect of the present invention, a method for manufacturing an arrester is specified. By way of example, the method serves for manufacturing the arrester described above.

In this case, at least one first film and at least one second film are provided. Preferably, green films, in particular ceramic green films, are involved. A plurality of first films and a plurality of second films can also be provided. Preferably, the first layer of the arrester is formed from the one or the plurality of first films and the second layer of the arrester is formed from the one or the plurality of second films.

A conductive material for forming electrodes is applied on a first film. The material is applied for example as a continuous strip. A hole is then introduced into the first film and the second film, wherein the hole in the first film perforates the conductive material. The first and second films are stacked one above another before or after the introduction of the hole, such that the conductive material is arranged between the first film and the second film.

Finally, at least one lower cover film and at least one upper cover film are provided and the first and second films are arranged between the lower and upper cover films. The film stack is subsequently sintered.

A plurality of aspects of an invention are described in the present disclosure. All properties disclosed in relation to the arresters and/or the method are also correspondingly disclosed in relation to the respective other aspects, and vice versa, even if the respective property is not explicitly mentioned in the context of the respective aspect.

The subjects described here are explained in greater detail below with reference to schematic figures that are not true to scale.

DETAILED DESCRIPTION OF ONE OR MORE EMBODIMENTS

Preferably, in the following figures, identical reference signs refer to functionally or structurally corresponding parts of the various embodiments.

Figure 1A:
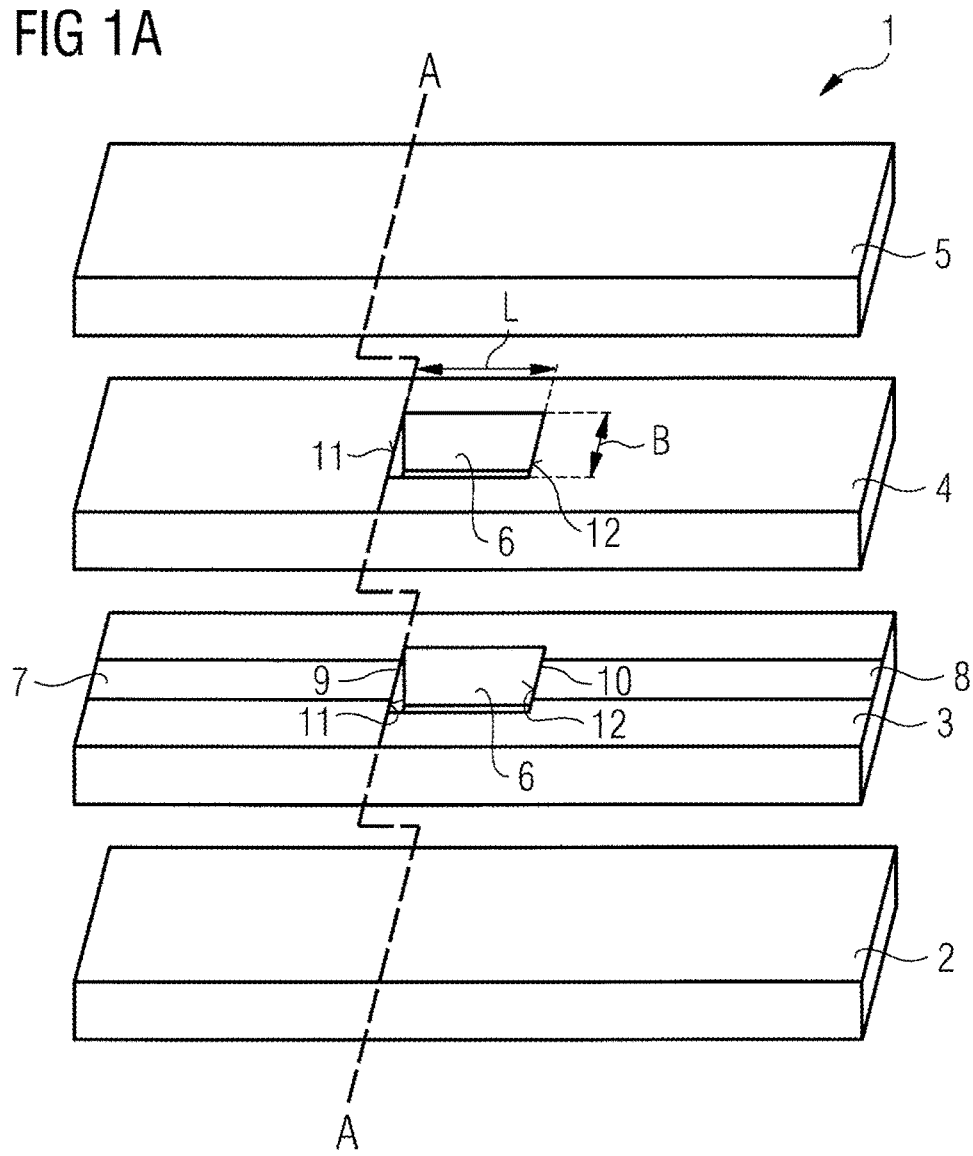
FIG. 1A shows one embodiment of an arrester in an exploded view.

FIG. 1A shows one embodiment of an arrester 1 in an exploded view.

The arrester 1 comprises a multiplicity of layers 2, 3, 4, 5 arranged one above another and is thus configured as a multilayer component. The layers 2, 3, 4, 5 are formed from an electrically insulating material. By way of example, the layers 2, 3, 4, 5 comprise a ceramic material. The layers 2, 3, 4, 5 are preferably all sintered jointly. In particular, the arrester 1 is configured as a monolithic component.

The layers 2, 3, 4, 5 can be produced in each case from one or a plurality of films, in particular green films, arranged one above another. By way of example, one or a plurality of the layers 2, 3, 4, 5 are formed in each case from a multiplicity of films, for example in each case from 20 films. The layers 2, 3, 4, 5 are in this case each configured as film assemblies. However, the layers 2, 3, 4, 5 can also each be formed from only one film. The number of films used depends on the thickness of the films and on the required properties of the arrester 1.

The arrester 1 comprises a lower cover layer 2 and an upper cover layer 5, between which central layers 3, 4 are arranged. By way of example, the lower cover layer 2 is the bottommost layer of the arrester 1 and the upper cover layer 5 is the topmost layer of the arrester 1.

The central layers 3, 4 have a cavity 6. In particular, the cavity 6 extends completely through the central layers 3, 4. The cavity 6 is delimited toward the bottom by the lower cover layer 2 and toward the top by the upper cover layer 5. In particular, the cavity 6 is delimited toward the bottom and top by the insulating material of the cover layers 2, 5.

The shape of the cavity 6 is preferably translationally invariant with respect to the stacking direction of the layers 2, 3, 4, 5. In particular, the cavity 6 has the shape of a right cylinder. In this case, the sidewalls delimiting the cavity 6 extend perpendicularly to the basic area, in particular perpendicularly to a base area and/or top area delimiting the cavity 6. The cavity 6 has in particular a basic area parallel to the layer planes and a height along the stacking direction of the layers 2, 3, 4, 5. In FIG. 1A, the cavity 6 has a rectangular basic area having a length L and a width B.

The cavity 6 is filled with a gas. The type of gas depends in particular on an atmosphere during the manufacture of the arrester 1, in particular on a sintering atmosphere during the sintering of the layers 2, 3, 4, 5. By way of example, sintering is carried out with exclusion of oxygen. By way of example, halides can also be added to the atmosphere.

Two electrodes 7, 8 are arranged on the first central layer 3 of the arrester 1. Consequently, the first central layer 3 constitutes an electrode-carrying layer. In particular, the electrodes 7, 8 are arranged between the two central layers 3, 4. The electrodes 7, 8 extend from one edge to the opposite edge of the first central layer 3 and are spaced apart from the other edges of the layer 3. The electrodes 7, 8 can also be regarded as a single strip perforated by the cavity 6.

The electrodes 7, 8 adjoin the cavity 6. In particular, the electrodes 7, 8 respectively have electrode ends 9, 10 arranged at the cavity 6. The electrode ends 9, 10 are arranged in particular at opposite sidewalls 11, 12 laterally delimiting the cavity 6. The electrode ends 9, 10 are configured for generating an arc flash in the event of a limit voltage being exceeded between the electrodes 7, 8.

By way of example, the electrodes 7, 8 comprise copper and/or tungsten. The electrodes 7, 8 can also comprise different materials in sections. By way of example, the electrode ends 9, 10 comprise tungsten and a section of the electrodes 7, 8 that is removed from the cavity 6 comprises a different material, e.g. copper.

Figure 1B:
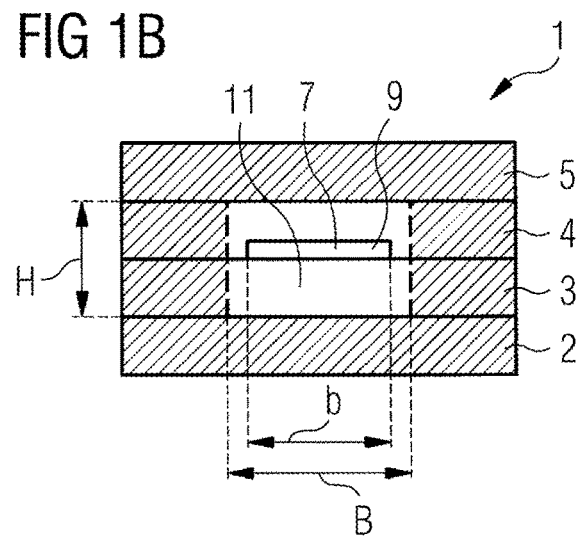
FIG. 1B shows a plan view of a section through the arrester in accordance with FIG. 1A.

FIG. 1B shows a plan view of a section through the arrester 1 from FIG. 1A at the position identified by A-A. In particular, the first side face 11 delimiting the cavity 6 can be seen here in the plan view. The electrode end 9 of the first electrode 7 is arranged at the first side face 11. The electrode end 9 thus forms a part of the first side face 11. A plan view of the second side face 12 corresponds to the plan view of the first side face 11.

The electrode ends 9, 10 each extend as narrow lines parallel to the layer planes and thus perpendicularly to the stacking direction. This configuration of the electrode ends 9, 10 results in a local field boosting and thus a defined region of the ignition of the arc flash.

The electrode ends 9, 10 are arranged completely between the central layers 3, 4 and thus do not project beyond the layers 3, 4. Apart from the position of the electrode ends 9, 10, the sidewall 11 is thus completely formed by the material of the first and second central layers 3, 4. The electrode ends 9, 10 in particular do not form a covering of the material of the first and second central layers 3, 4 within the cavity 6.

The electrode ends 9, 10 are arranged at half the height H of the cavity 6. In this case, the height direction corresponds to the stacking direction. In particular, the electrode ends 9, 10 are spaced apart from the base and top areas delimiting the cavity 6. In particular, the electrodes 7, 8 do not adjoin the upper or lower cover layer 2, 5, which delimit the cavity 6 toward the bottom and top. Furthermore, the width b of the electrodes 7, 8 and correspondingly of the electrode ends 9, 10 is less than the width B of the cavity 6.

Consequently, the electrode ends 9, 10 do not adjoin other areas delimiting the cavity 6 and are only arranged in each case at a single side face 11, 12. This makes it possible to ensure that the free length between the electrode ends 9, 10, i.e. the length of the path through the gas-filled cavity 6, is shorter than a path between the electrode ends 9, 10 along the material of the layers 2, 3, 4, 5. It is thus ensured that a defined gas discharge between the electrode ends 9, 10, in particular an arc flash, is generated when an ignition voltage is reached.

The electrodes 7, 8 are preferably connected to further contacts (not depicted). The further contacts can be configured as caps on opposite sides of the arrester 1, in particular as caps on the narrow sides of the arrester 1. Preferably, the arrester 1 is configured as an SMD component, i.e. as a surface-mountable component. The arrester 1 is configured for example for mounting on a printed circuit board.

Figure 2:
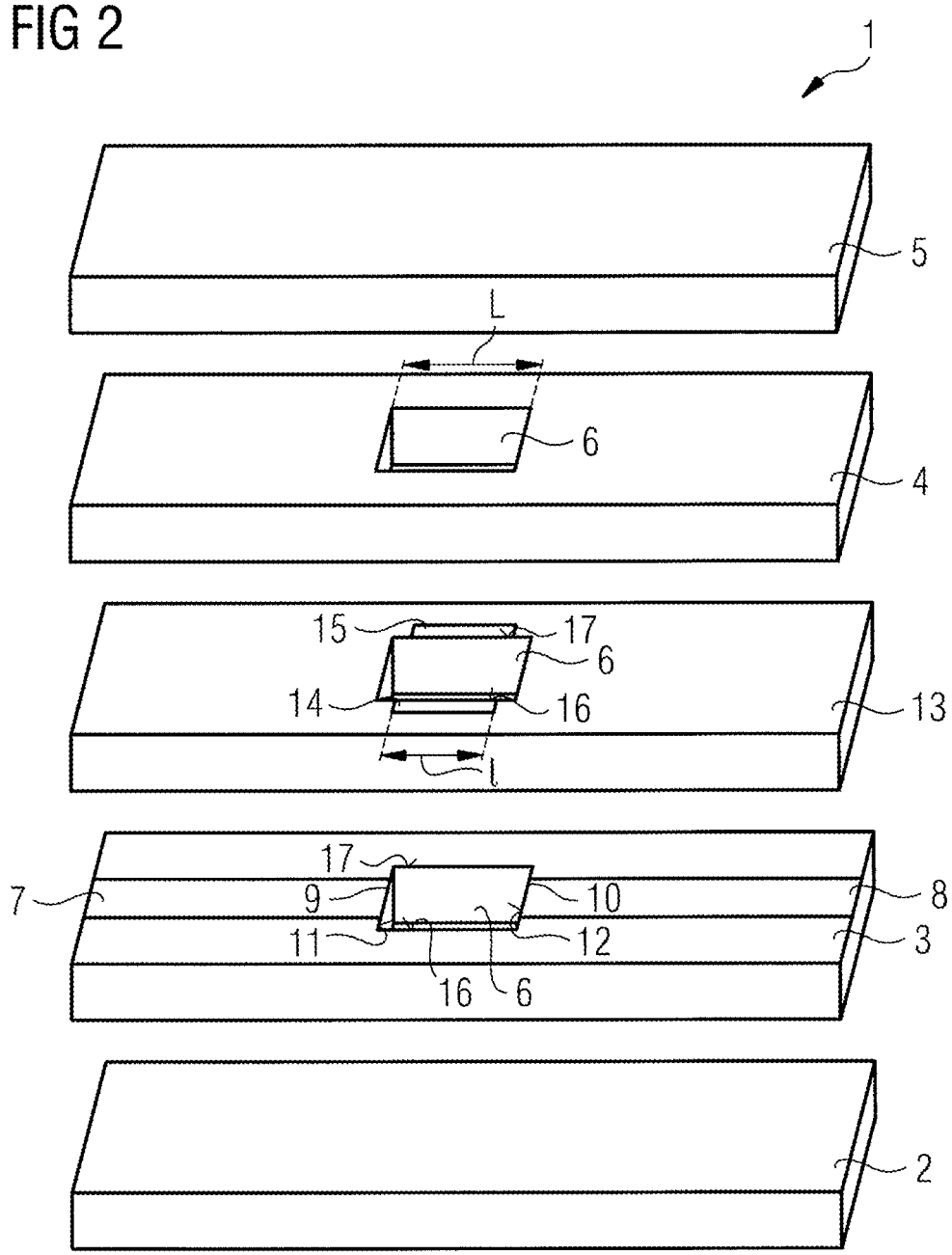
FIG. 2 shows a further embodiment of an arrester in an exploded view.

FIG. 2 shows a further embodiment of an arrester 1 in an exploded view.

In contrast to the arrester 1 shown in FIGS. 1A and 1B, the arrester 1 shown here additionally comprises two auxiliary electrodes 14, 15. The auxiliary electrodes 14, 15 are arranged on a further central layer 13, in particular a third central layer 13. In further embodiments, the arrester 1 can also comprise only one auxiliary electrode or more than two auxiliary electrodes. The further central layer 13 is arranged between the first electrode-carrying central layer 3 and the second central layer 4. Consequently, the auxiliary electrodes 14, 15 are configured in a height-offset manner with respect to the electrodes 8, 9.

In an alternative embodiment, the auxiliary electrodes 14, 15 can also be arranged on the same layer 3 as the electrodes 7, 8. In a further alternative embodiment, the further central layer 13 can also be arranged between the lower cover layer 2 and the electrode-carrying central layer 3.

Like the other layers 2, 3, 4, 5, the further central layer 13 can be formed from a multiplicity of films. The cavity 6 also extends through the further central layer 13.

The auxiliary electrodes 14, 15 are arranged at opposite side faces 16, 17 delimiting the cavity 6. The auxiliary electrodes 14, 15 are arranged at different side faces 16, 17 than the electrode ends 9, 10. The auxiliary electrodes 14, 15 do not adjoin the electrodes 7, 8. The length l of the auxiliary electrodes 14, 15 is less than the length L of the cavity 6.

The auxiliary electrodes 14, 15 function as an ignition aid during the formation of the gas discharge between the electrodes 7, 8. The auxiliary electrodes 14, 15 preferably comprise a different material than the electrodes 7, 8. By way of example, the auxiliary electrodes 14, 15 comprise graphite or carbon.

The auxiliary electrodes 14, 15 are configured in each case as a narrow strip adjoining the further side faces 16, 17. In a plan view of a further side faces 16, 17, the auxiliary electrodes 14, 15 can be seen as narrow lines parallel to the plane of the layers.

Figure 3:
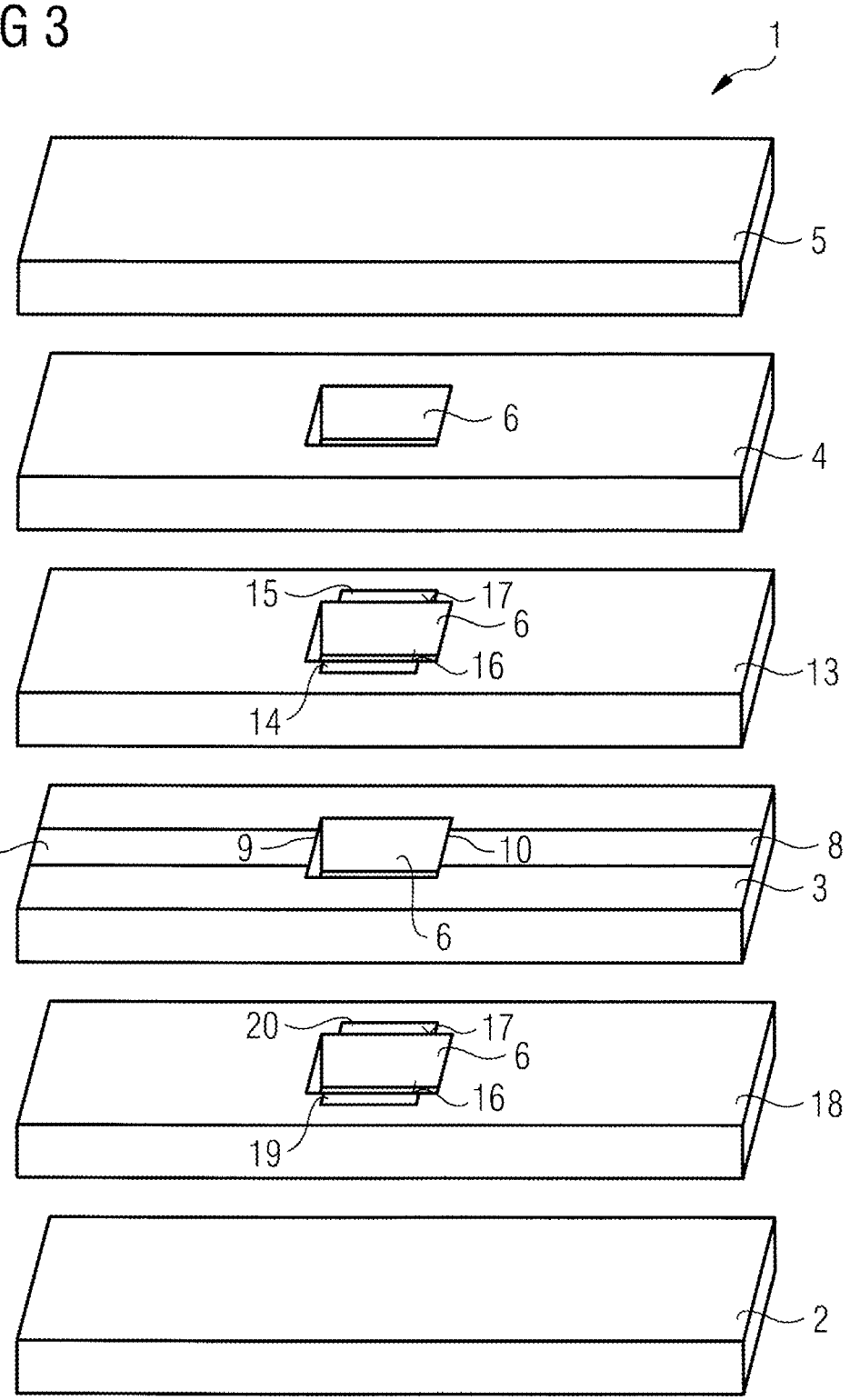
FIG. 3 shows a further embodiment of an arrester in an exploded view.

FIG. 3 shows a further embodiment of an arrester 1 in an exploded view.

In contrast to the arrester 1 from FIG. 2, the arrester 1 again comprises a further central layer 18, in particular a fourth central layer 18. The fourth central layer 18 is arranged between the first lower cover layer 2 and the electrode-carrying layer 3. The fourth central layer 18 is configured like the third central layer 13. In particular, the cavity 6 extends through the fourth central layer 18, and further, third and fourth auxiliary electrodes 19, 20 are arranged on the fourth central layer 18.

The third and fourth auxiliary electrodes 19, 20 are arranged below the plane of the electrodes 7, 8, while the first and second auxiliary electrodes 14, 15 are arranged above the plane of the electrodes 7, 8. The third and fourth auxiliary electrodes 19, 20 are arranged at the same side faces 16, 17 as the first and second auxiliary electrodes 14, 15.

Figure 4:
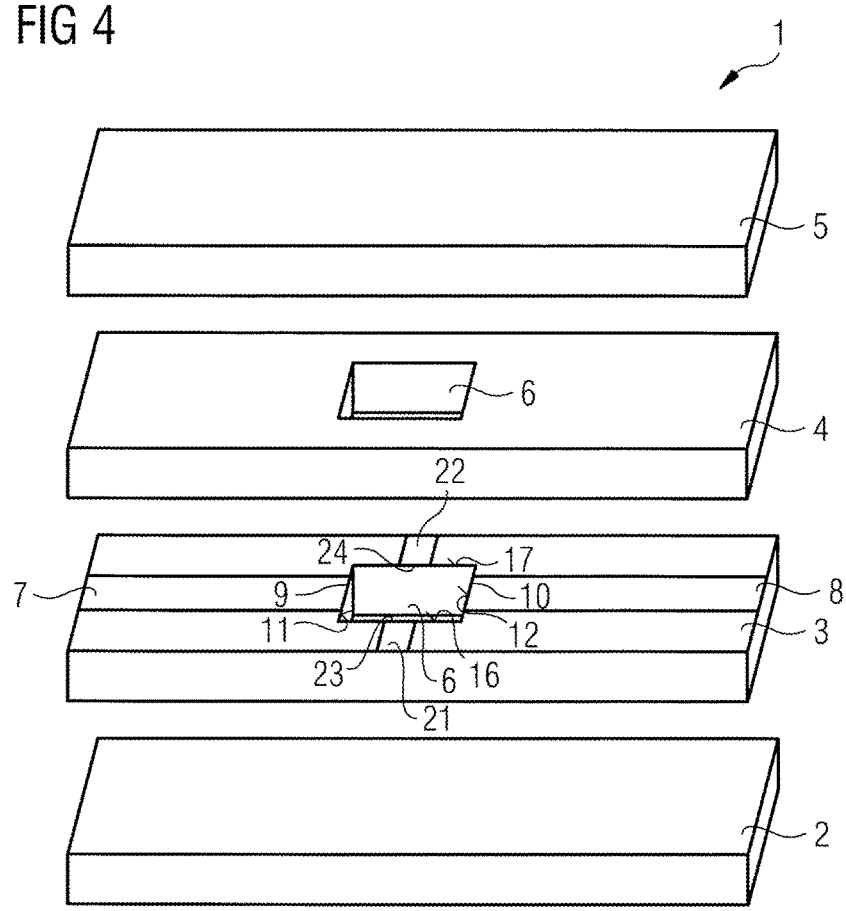
FIG. 4 shows a further embodiment of an arrester in an exploded view.

FIG. 4 shows a further embodiment of an arrester 1 in an exploded view.

In contrast to the arrester 1 from FIG. 1, here two further electrodes 21, 22, i.e. third and fourth electrodes 21, 22, are also present in addition to the first and second electrodes 7, 8. The further electrodes 21, 22 preferably comprise the same material as the first and second electrodes 7, 8. The further electrodes 21, 22 are arranged on the same layer 3 as the first and second electrodes 7, 8.

The third and fourth electrodes 21, 22 have electrode ends 23, 24 arranged at different side faces 16, 17 than the electrode ends 9, 10 of the first and second electrodes 7, 8. In particular, the electrodes 7, 8, 21, 22 form a cross that is perforated by the cavity 6 in the center. Like the electrode ends 9, 10 of the first and second electrodes 7, 8, the electrode ends 23, 24 of the third and fourth electrodes 21, 22 extend in a plane parallel to the layer planes.

The electrodes 8, 9, 21, 22 can be interconnected for example in such a way that a gas discharge from the first and/or second electrodes 7, 8 to the third and/or fourth electrodes 21, 22 takes place in the event of a limit voltage being exceeded. By way of example, the first and second electrodes 7, 8 are at a common potential and the third and fourth electrodes 21, 22 are at a common potential. However, the electrodes 7, 8, 21, 22 can also all be at different potentials.

In an alternative embodiment, the further electrodes 21, 22 are arranged on a different layer than the first and second electrodes 7, 8.

This arrester 1, too, can comprise one or a plurality of auxiliary electrodes 14, 15, 19, 20 as in the embodiments in accordance with FIGS. 2 and 3.

Figure 5:
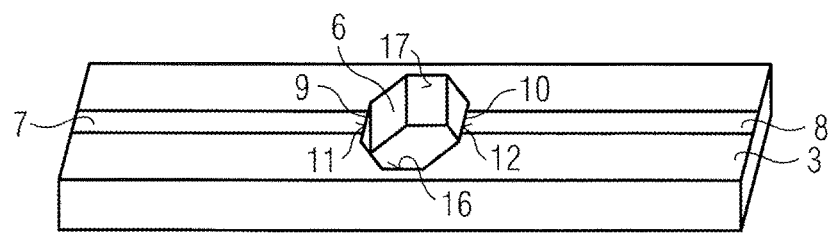
FIG. 5 shows a further embodiment of an arrester on the basis of a perspective view of a layer of the arrester.
Figure 6A:
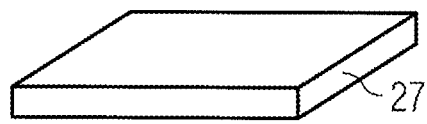
FIGS. 6A-6E show method steps in the manufacture of an arrester.
Figure 6B:
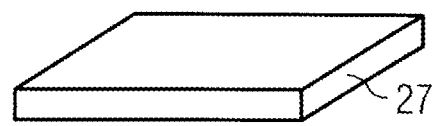
Figure 6B:
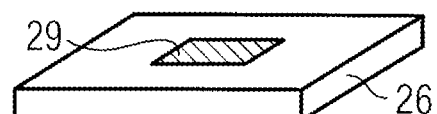
Figure 6B:
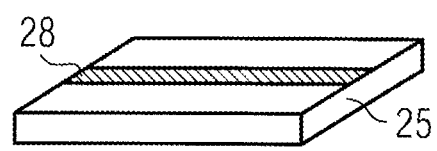
Figure 6C:
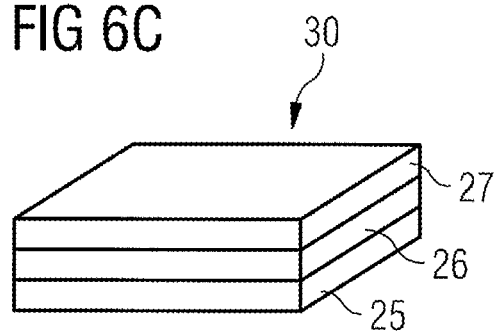
Figure 6D:
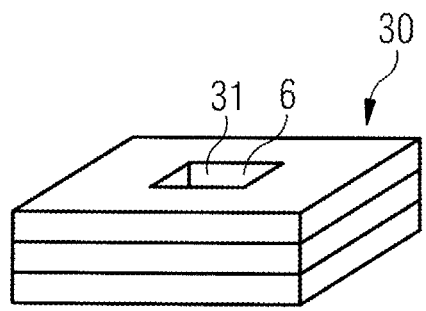
Figure 6E:
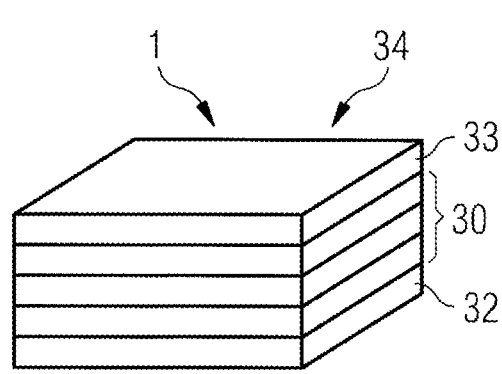

FIG. 5 shows a further embodiment of an arrester 1, wherein only the first, electrode-carrying central layer 3 is shown here. The cavity 6 here has a non-rectangular basic area. The basic area is configured in the form of a polygon having more than four corners. In particular, the basic area is configured in the form of an octagon. In this case, the polygon is mirror-symmetrical with respect to a plane extending perpendicularly to the basic area, parallel to the electrode ends 9, 10 and centrally through between the electrode ends 9, 10. Furthermore, the polygon is mirror-symmetrical with respect to a plane extending perpendicularly to the basic area, perpendicularly to the electrode ends 9, 10 and through the center of the electrode ends 9, 10. Preferably, all internal angles of the basic area have values of less than or equal to 180°.

By way of example, the polygon has an elongated shape. In particular, the side faces 11, 12 of the cavity 6, at which side faces the electrode ends 9, 10 are arranged, are at a greater distance from one another than other, opposite side faces 16, 17. By way of example, the diameter of the cavity 6 from one electrode end 9 to the opposite electrode end 10 is greater than perpendicular thereto. In an alternative embodiment, the polygon can be configured in a regular fashion. Preferably, here as well the width of the electrode ends 9, 10 is less than the width of the side faces 11, 12 at which the electrode ends 9, 10 are arranged.

The embodiment shown in FIG. 5 can be combined arbitrarily with the embodiments shown in FIGS. 1A to 4. By way of example, auxiliary electrodes can also be present in the embodiment shown in FIG. 5.

FIGS. 6A-6E show method steps during the manufacture of an arrester, for example of the arrester 1 in accordance with FIG. 2.

A first method step 6A involves providing at least three films 25, 26, 27 for forming the three central layers 2, 3, 4 of the arrester 1. The films 25, 26, 27 are configured for example as green films, in particular ceramic green films. The central layers 2, 3, 4 can also be formed from more than one film in each case. By way of example, a multiplicity of films, e.g. 20 films, are provided for each of the central layers 2, 3, 4. In this method step, the films 25, 26, 27 still have no printing and no holes.

In a further method step 6B, a conductive material 28 for forming the electrodes 7, 8 is applied on the first film 25, from which the first central layer 3 is formed. By way of example, the material 28 is applied in the form of an electrode paste, e.g. in a screen printing method. The material 28 contains or consists of copper and/or tungsten, for example. In this case, the material 28 is applied as a continuous area, in particular as a continuous strip. In this case, the material extends from one edge of the first film 25 as far as the opposite edge of the first film 25.

A further material 29 for forming the auxiliary electrodes 14, 15 is applied on the second film 26. The further material 29 is applied as a continuous area. The material 29 is applied only in a central region on the film 26 and thus does not extend as far as an edge of the film 26. The further material 29 is for example graphite or contains graphite.

In a further method step 6C, the films 25, 26, 27 are stacked one above another to form a partial film stack 30 and laminated.

In a further method step 6D, a hole 31 for forming the cavity 6 is introduced into the partial film stack 30. In this case, the hole 31 leads through the entire partial film stack 30. By way of example, the hole 31 is produced by stamping out, e.g. by mechanical stamping out or by laser stamping. As a result of the hole 31 being formed, the applied material 28 for forming the electrodes 8, 9 and the material 29 for forming the auxiliary electrodes 14, 15 are in each case separated into two parts.

A further method step 6E involves providing at least two cover films 32, 33 for forming the lower and upper cover layers 2, 5. A plurality of films in each case can also be used for the lower and upper cover layers 2, 5. The cover films 32, 33 are preferably configured like the films 25, 26, 27 for forming the central layers 3, 4, 5. In particular, ceramic green films can be involved.

The partial film stack 30 is arranged between the lower cover film 32 and the upper cover film 33, such that a film stack 34 is formed. In this case, the hole 31 is covered by the cover films 32, 33 from the bottom and top, thus giving rise to a cavity 6 situated wholly in the interior of the film stack 34 then formed. The film stack 34 is subsequently sintered.

Further contacts for making electrical contact with the electrodes 8, 9 can be formed before or after the sintering. By way of example, the further contacts are applied as caps on opposite sides of the film stack 34.

The production of the layers 2, 3, 4, 5 only from respectively one film 32, 25, 26, 27, 33 was described above for the sake of simplified illustration. Production of the layers from respectively a plurality of films is carried out analogously. By way of example, individual film assemblies can already be formed from a plurality of films before the formation of the partial film stack 30 in step 6C. By way of example, film assemblies are already present instead of individual films 25, 26, 27 in step 6A or 6B. However, it is also possible for the films to all be arranged one above another only in step 6C, such that film assemblies are not yet present up until then. Furthermore, the introduction of the hole 31 in accordance with step 6D can also be carried out in the case of individual film assemblies that are stacked one above another only afterward.

The invention claimed is:

1. An arrester, comprising a plurality of layers arranged one above another, a cavity extending through at least two of the layers, wherein electrodes adjoining the cavity are arranged between said at least two layers and at least one auxiliary electrode adjacent the cavity that is located on a different layer than the electrodes.

2. The arrester according to claim 1, wherein the layers comprise a lower cover layer and an upper cover layer, which delimit the cavity toward the bottom and top, wherein the electrodes are spaced apart from the lower cover layer and the upper cover layer.

3. The arrester according to claim 1, wherein the electrodes comprise electrode ends configured for forming an arc flash, wherein the electrode ends extend parallel to the plane of the layers.

4. The arrester according to claim 1, wherein the electrode ends are arranged at half the height (H) of the cavity.

5. The arrester according to claim 1 further comprising at least four electrodes that are each led as far as an outer edge of the stack of the layers.

6. The arrester according to claim 5, wherein the four electrodes are arranged in the form of a cross that is perforated by the cavity.

7. The arrester according to claim 1, wherein the cavity has a rectangular basic area.

8. The arrester according to claim 1, wherein the cavity has an octagonal basic area.

9. The arrester according to claim 1, wherein the electrodes comprise different materials in sections.

10. The arrester according to claim 9, wherein the electrode ends comprise tungsten and a different section of the electrodes comprises copper.

11. A method for manufacturing an arrester, comprising the following steps:

providing at least one first film, at least one second film and at least one third film, applying a conductive material for forming electrodes on the first film and applying a material for forming at least one auxiliary electrode on the second film, stacking the at least one first film and the at least one second film, introducing a hole into the first film, the second film and the third film, wherein the hole in the first film perforates the conductive material and the hole in the second film perforates the material for forming the at least one auxiliary electrode on the second film, providing at least one lower cover film and one upper cover film and arranging the first film and the second film between the lower cover film and the upper cover film, wherein the electrodes are spaced apart from the lower cover film and the upper cover film.

12. The method according to claim 11, wherein the first film and the second film are arranged one above the other to form a partial film stack, such that the conductive material is arranged between the first film and the second film.

13. An arrester, comprising
a plurality of layers arranged one above another, and
a cavity extending through at least two of the layers, wherein electrodes adjoining the cavity are arranged between said two layers, wherein the cavity has an octagonal basic area.

\* \* \* \* \*